United States Patent
Foss et al.

(10) Patent No.: US 9,073,608 B1
(45) Date of Patent: Jul. 7, 2015

(54) MULTI-POSITION LOUNGE SEAT FOR MARINE VESSELS

(71) Applicants: Charles Dean Foss, New Smyrna Beach, FL (US); Gordon James Turner, Jr., Mims, FL (US)

(72) Inventors: Charles Dean Foss, New Smyrna Beach, FL (US); Gordon James Turner, Jr., Mims, FL (US)

(73) Assignee: Boston Whaler, Inc., Edgewater, FL (US)

( * ) Notice: Subject to any disclaimer, the term of this patent is extended or adjusted under 35 U.S.C. 154(b) by 107 days.

(21) Appl. No.: 13/954,187

(22) Filed: Jul. 30, 2013

(51) Int. Cl.
*B60N 2/02* (2006.01)
*B63B 29/04* (2006.01)
*B60N 2/20* (2006.01)
*A47C 17/16* (2006.01)
*A47C 13/00* (2006.01)
*B64D 11/00* (2006.01)

(52) U.S. Cl.
CPC ............... *B63B 29/04* (2013.01); *B60N 2/203* (2013.01); *A47C 17/16* (2013.01); *A47C 13/00* (2013.01); *B60N 2/0292* (2013.01); *B64D 2011/0084* (2013.01); *B64D 2011/0076* (2013.01)

(58) Field of Classification Search
USPC .......................... 297/94, 100, 188.1, 376, 126
See application file for complete search history.

(56) References Cited

U.S. PATENT DOCUMENTS

| | | | | |
|---|---|---|---|---|
| 250,597 A | * | 12/1881 | St. John | 297/100 |
| 378,433 A | * | 2/1888 | Cooper | 297/328 |
| 436,829 A | * | 9/1890 | Gilfillan | 297/94 |
| 461,198 A | * | 10/1891 | Henry | 297/101 |
| 489,562 A | * | 1/1893 | Johnston | 297/97 |
| 692,333 A | * | 2/1902 | Orr | 297/94 |
| 831,877 A | * | 9/1906 | Kling | 297/94 |
| 1,102,899 A | * | 7/1914 | Fox | 224/415 |
| 1,980,559 A | * | 11/1934 | Thompson | 297/66 |
| 2,113,346 A | * | 4/1938 | Heath | 297/126 |
| 2,152,002 A | * | 3/1939 | Thibeault et al. | 297/126 |
| 2,466,204 A | * | 4/1949 | Brown | 297/115 |
| 2,518,860 A | * | 8/1950 | Blue | 297/376 |
| 2,610,329 A | * | 9/1952 | Strathaus | 5/59.1 |
| 2,634,429 A | * | 4/1953 | Hopeman, Jr. et al. | 5/43 |
| 2,679,653 A | * | 6/1954 | Blanke et al. | 5/12.1 |
| 2,950,753 A | * | 8/1960 | Gleitsman et al. | 297/188.01 |
| 2,971,568 A | * | 2/1961 | Rorie et al. | 297/188.09 |
| 2,994,364 A | * | 8/1961 | Gleitsman et al. | 297/423.46 |
| 3,099,482 A | * | 7/1963 | Woodruff, Sr. | 297/188.09 |
| 3,379,471 A | * | 4/1968 | Dalziel | 297/92 |

(Continued)

FOREIGN PATENT DOCUMENTS

DE        4228037 A1  *  3/1994  ............. A47B 85/00

*Primary Examiner* — David E Allred
(74) *Attorney, Agent, or Firm* — Malin Haley DiMaggio & Bowen, P.A.

(57) ABSTRACT

A seating system for watercraft having a base supporting a seating surface and a backrest pivotably attached to the base. The backrest pivots above the seating surface to provide a plurality of selectable seating positions. The backrest is pivotably attached to the base an arm attached to the side of the backrest. The arm engages a guide member attached to the base, the guide member having one or more positional slots corresponding to the plurality of selectable seating positions. The backrest can be positioned upright, at an angle, or flat with respect to the seating surface to provide a plurality of seating configurations including simultaneous forward and aft seats, an aft-facing lounge seat, and a sunpad. The seating surface comprises hingeable seat cushions permitted access to storage compartments inside the base. The seating system can be installed adjacent to a bulkhead on a watercraft to provide an aft-facing lounge seat.

9 Claims, 6 Drawing Sheets

(56) References Cited

U.S. PATENT DOCUMENTS

| | | | |
|---|---|---|---|
| 4,470,629 A * | 9/1984 | Collins, Jr. | 297/64 |
| 4,779,917 A * | 10/1988 | Campbell et al. | 296/65.09 |
| 5,149,171 A * | 9/1992 | Gilevich et al. | 297/94 |
| 5,517,706 A * | 5/1996 | Kashima et al. | 5/12.1 |
| 5,622,404 A * | 4/1997 | Menne | 297/188.1 |
| 5,718,475 A * | 2/1998 | Watts | 297/127 |
| 5,718,479 A | 2/1998 | Rautenbach | |
| 5,799,605 A * | 9/1998 | Huse | 114/363 |
| 5,902,009 A * | 5/1999 | Singh et al. | 297/188.1 |
| 6,199,945 B1 | 3/2001 | Kim | |
| 6,283,059 B1 * | 9/2001 | Scully, Jr. | 114/363 |
| 6,488,333 B2 | 12/2002 | Kim | |
| 6,494,531 B1 * | 12/2002 | Kim | 297/94 |
| 6,869,121 B2 * | 3/2005 | Kayumi et al. | 296/37.15 |
| 6,883,458 B2 * | 4/2005 | Huse | 114/363 |
| 6,929,321 B1 * | 8/2005 | Shrock | 297/118 |
| 6,945,190 B1 * | 9/2005 | Frandsen | 114/363 |
| 6,988,774 B1 * | 1/2006 | Elzenbeck | 297/452.56 |
| 7,121,606 B2 * | 10/2006 | Khan et al. | 296/37.15 |
| 7,172,252 B2 * | 2/2007 | Henning | 297/354.13 |
| 7,237,845 B2 * | 7/2007 | Mulmed | 297/440.14 |
| 7,281,761 B2 * | 10/2007 | Brown et al. | 297/95 |
| 7,341,306 B1 * | 3/2008 | Neese et al. | 297/105 |
| 7,484,795 B2 * | 2/2009 | Saint-Jalmes et al. | 297/94 |
| 7,523,985 B2 * | 4/2009 | Bhatia et al. | 297/188.04 |
| 7,523,989 B2 * | 4/2009 | Wieland et al. | 297/440.13 |
| 7,661,382 B2 | 2/2010 | Wood et al. | |
| 8,091,957 B2 * | 1/2012 | Allmann | 297/129 |
| 8,770,661 B2 * | 7/2014 | Kalergis et al. | 297/188.1 |
| 2002/0005649 A1 * | 1/2002 | Hofmann et al. | 296/37.15 |
| 2003/0030306 A1 * | 2/2003 | Raczkowski | 297/118 |
| 2004/0090101 A1 * | 5/2004 | Andersson et al. | 297/354.12 |
| 2004/0094999 A1 * | 5/2004 | Volotsenko | 297/188.1 |
| 2006/0076819 A1 * | 4/2006 | Burch | 297/452.18 |
| 2007/0158986 A1 * | 7/2007 | Adams et al. | 297/342 |
| 2007/0222261 A1 * | 9/2007 | True | 297/188.1 |
| 2009/0146477 A1 * | 6/2009 | Yamada et al. | 297/354.1 |
| 2009/0277372 A1 * | 11/2009 | Wood et al. | 114/363 |
| 2010/0201163 A1 * | 8/2010 | Dunkel | 297/124 |
| 2013/0328356 A1 * | 12/2013 | Dorca et al. | 297/94 |
| 2014/0138991 A1 * | 5/2014 | Deimen et al. | 297/101 |
| 2014/0210235 A1 * | 7/2014 | Ferry et al. | 297/118 |
| 2014/0225403 A1 * | 8/2014 | Shimada et al. | 297/188.1 |

* cited by examiner

MULTI-POSITION LOUNGE SEAT FOR MARINE VESSELS

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

1. Field of the Invention

The present invention generally relates to marine vessels and watercraft and more particularly to a multi-position lounge seat for marine vessels and watercraft.

2. Description of Related Art

Marine vessel and watercraft designs have included a variety of seating arrangements and designs for the boaters. Specifically, there are many different designs for seats located within a boat, especially for open topped boats commonly used for day trips of limited duration for recreational or sport fishing purposes. Many seats provide the user with a variety of positions in which to sit such as forward-facing, aft-facing, lounging, etc. However, due to the limited space within a boat, these different positions must be operable within small parameters, necessitating thoughtful and ergonomic design.

Typically, modern boats have seats which are rigidly fixed and can only change from providing an upright position to providing a reclining position, but the user's legs are left without support. Other designs provide the ability to recline, but with cumbersome parts and uncomfortable ergonomics. Further, users of boats often desire to stretch out or relax in comfort but because of the limited space provided on the seat of a boat, this is either impossible or uncomfortable.

Although prior designs have sought to improve the structure, operation, and utility of seats on marine vehicles, these designs have failed to adequately maximize space and allow for a variety of seated, lounging, and sunbathing positions. For example, U.S. Pat. No. 5,799,605 issued to Huse discloses an expandable boat seat that utilizes a slidable base in order to expand and contract the available seating surface. U.S. Patent Application Publication No. 2007/0158986 to Adams et al. discloses an adjustable sun lounge which converts from a seating configuration to a sunbathing configuration and sun lounge by way of a pivoting, dual-sided backrest. U.S. Pat. No. 7,241,306 to Neese et al. describes a convertible seat assembly which includes two seats in back to back relationship whereby the base of one seat can be extended out to form a lounge seat on one side with a standard seat on the other, sharing a single back rest. While these designs provide some modularity as to seating positions, they require complex, heavier mechanisms that require a large amount of free space and are substantially limited as to the number of possible seating positions. Accordingly, there is a need in the art for a better designed, more modular seating system for marine vessels that provides optimum comfort and a variety of usable seating, lounging, and sunbath positions while maintaining simple operation and a unified appearance.

It is, therefore, to the effective resolution of the aforementioned problems and shortcomings of the prior art that the present invention is directed. However, in view of the marine vessel seating systems in existence at the time of the present invention, it was not obvious to those persons of ordinary skill in the pertinent art as to how the identified needs could be fulfilled in an advantageous manner.

SUMMARY OF THE INVENTION

The present invention provides a seating system for a marine vessel or watercraft, comprising a base supporting a seating surface and a backrest pivotably attached to the base. The backrest is configured to pivot above the seating surface to provide a plurality of selectable seating positions.

In some embodiments, the backrest is pivotably attached to the base by one or more arms disposed at a respective side of the backrest. One or more of the arms releasably engages a guide member attached to the base, the guide member having one or more positional slots corresponding to the plurality of selectable seating positions. In one of the selectable seating positions, the backrest is oriented substantially perpendicular to the seating surface such that the seating system provides an aft seat and a forward seat. In another of the selectable seating positions, the backrest is oriented substantially parallel to the seating surface such that the seating system provides a sunpad. In yet another one of the selectable seating positions the backrest is oriented at an angle between zero and ninety degrees with respect to said seating surface such that said seating system provides an aft-facing lounge seat and/or a forward facing leaning post. In some embodiments, the angle is between thirty and forty five degrees. In other embodiments, the seating system is installed adjacent to a bulkhead or gunwale of a vessel such that the bulkhead can be used as a supplemental backrest or footrest, particularly when the seating system is in the sunpad configuration. The orientation of the seating system and its various seating positions can be altered by varying the orientation and direction that the system is installed in the vessel.

In some embodiments, the seating surface is comprised of one or more cushions hingeably attached to said base. The base includes one or more internal storage compartments which are accessible by lifting the cushions of the seating surface. In some embodiments, an aft cushion is adapted to hinge upward with respect to the base and be locked in position to provide a forward-facing lounge seat.

Accordingly, it is an object of the present invention to provide a simple to operate and versatile seating system suitable for installation on a marine vessel or watercraft.

It is another object of the present invention to provide a convertible seating system that provides a plurality of selectable seating positions including simultaneous forward and aft seats, an aft-facing lounge seat, a forward-facing lounge seat, and a sunpad.

It is another object of the present invention to provide a convertible seating system that provides a plurality of selectable seating positions without taking up substantial deck space.

In accordance with these and other objects which will become apparent hereinafter, the instant invention will now be described with particular reference to the accompanying drawings.

DETAILED DESCRIPTION

Figure 1:
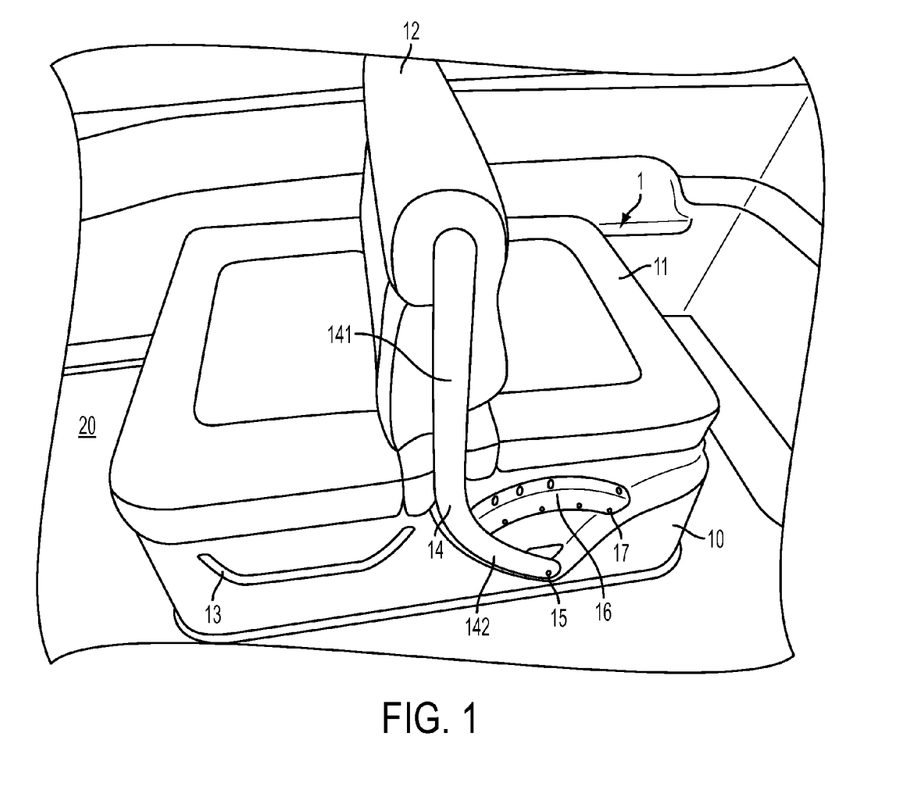
FIG. 1 is a perspective view of one embodiment of the seating system of the present invention showing the backrest in an upright position.

With reference to FIG. 1 shown is one embodiment of the seating system 1 of the present invention. Seating system 1 comprises a base 10 that, in some embodiments, comprises a generally rectangular box-like structure although other shapes are suitable. The base 10 supports a seating surface 11 that comprises one or more cushions as further described herein. Attached to the base 10 and pivoting above seating surface 11 is a backrest 12. Base 10 may further include one or more grab rails 13 which provide gripping surfaces for boaters utilizing the seating system 1. As shown in FIG. 1, seating system 1 is disposed on the deck 20 of a marine vessel or watercraft. The specific installation location, size, and overall shape the seating system 1 is not limited, however, to the embodiments shown herein.

Figure 2:
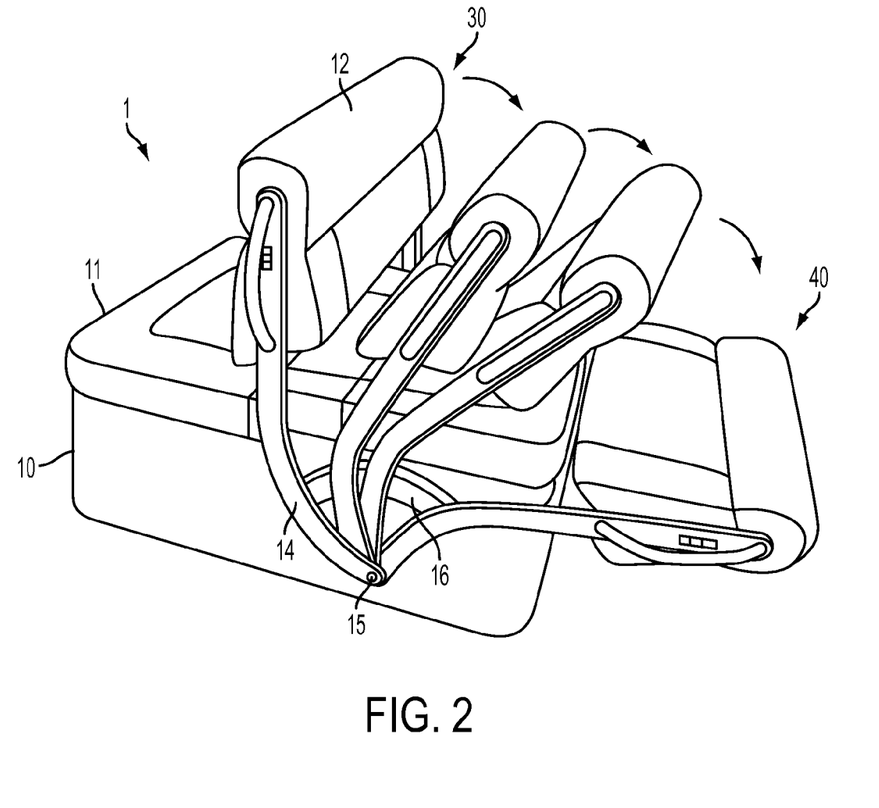
FIG. 2 is a perspective view of one embodiment of the seating system of the present invention showing the backrest in a plurality of possible position.

Backrest 12 is connected to base 10 by one or more arms 14. In FIG. 1, arm 14 includes an upper straight portion 141 that is attached to the side of backrest 12 and a lower curved portion 142 that is attached to base 10 at pivot point 15. In some embodiments, pivot point 15 is not centered with respect to the base 10 but is rather offset from the laterally extending centerline of the base 10 in order to work in conjunction with the curved portion 142 of arm 14 to provide the selectable backrest 12 positions described herein. The curved portion 142 of arm 14 is engaged with a curved guide member 16 that is attached to base 10. In some embodiments, the curved guide member 16 is disposed between the seating surface 11 and the pivot point 15. Guide member 16 includes one or more positional slots 17 that are configured to releasably retain arm 14. As shown in FIGS. 1-2, the guide member 16 allows the arm 14 and therefore backrest 12 to pivot about pivot point 15 of base 10 and be selectively retained in a plurality of positions. In some embodiments, backrest 12 is configured to pivot with respect to base 10 along a 90 degree range of motion in one direction, beginning at a upright position 30 wherein backrest 12 is substantially perpendicular to base 10 and ending at a flat position 40 wherein backrest 12 is substantially parallel to base 10 and substantially level with seating surface 11.

Figure 3:
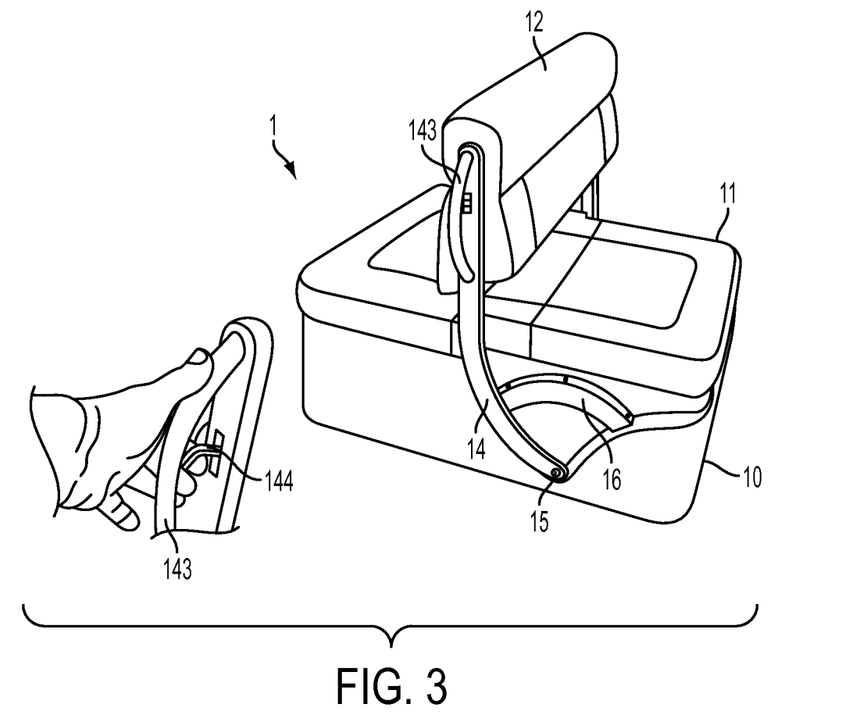
FIG. 3 is a perspective view of one embodiment of the seating system of the present invention showing the operation of the backrest.

FIG. 3 demonstrates one embodiment of the means why which to articulate backrest 12 with respect to base 10. In some embodiments arm the upper straight portion 141 of arm 14 includes a handle 143. Disposed between the handle 143 and the arm 14 is an actuator 144. Actuator 144 is configured to retract a pin or similar retaining means on the inside or arm 14. The pin selectively engages the one or more positional slots 17 on guide member 16. To free the backrest 12, the user activates the actuator 144 which retracts the pin from its current positional slot 17. The user then moves the backrest 12 to the desired position which causes the pin to align with the desired positional slot 17. At this point, the actuator 144 can be released, causing the pin to extend into its adjacent slot 17, thereby allowing the guide member 16 to retain backrest 12 in position.

Figure 4:
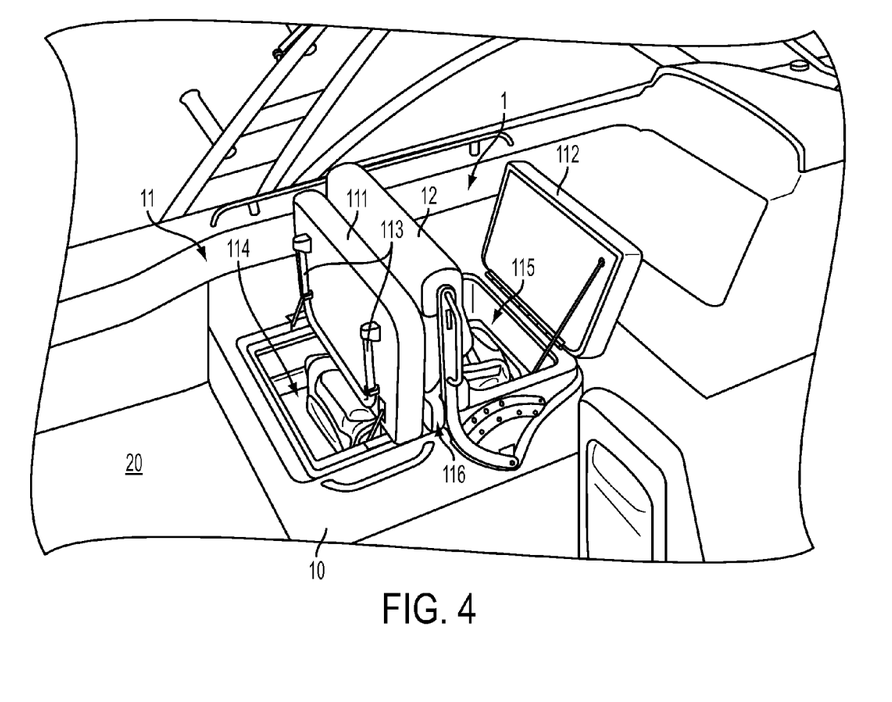
FIG. 4 is a perspective view of one embodiment of the seating system of the present invention showing the seat cushions in an opened position revealing storage compartments.

FIG. 4 shows additional functionality provided by seating system 1. In some embodiments the seating surface 11 comprises a plurality of cushions including an aft cushion 111, a forward cushion 112, and a middle cushion 116 disposed between the first and forward cushions. In some embodiments, base 10 has a hollow interior defining storage compartments 114 and 115. In some embodiments these compartments are separated inside base 10 but may be coextensive in other embodiments. To access the storage compartments, the first and forward cushions 111 and 112 are hingeably attached to the top of base 10. This allows the cushions to pivot upward with respect to base 10, revealing the storage compartments 114 and 115. In some embodiments, one or more hinges 113 are attached between the underside of the cushions and the top of base 10 to provide resilient hinging action. In some embodiments, the hinges 113 are lockable in order to retain the cushion in an upright or partially upright position. It is appreciated that the first and forward cushions 111 and 112 can be configured to pivot and open in any direction relative to the base 10 depending on the desired design and location of the seating system 1.

Figure 5A:
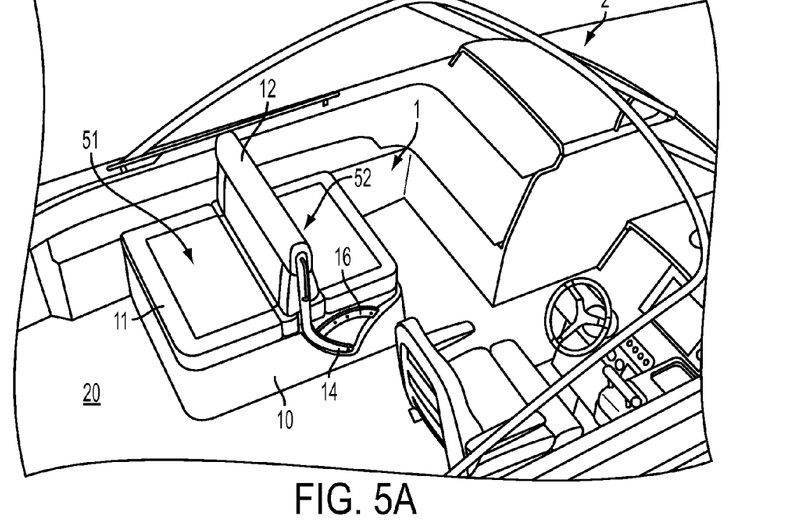
FIG. 5A is a perspective view of one embodiment of the seating system of the present invention configured as aft and forward seats.

FIGS. 5A-5D depict four non-limiting seating positions made possible by the seating system 1 of the present invention. FIG. 5A shows backrest 12 in a fully upright position, positioned substantially perpendicular to the seating surface 11. In this configuration, backrest 12 divides the seating surface 11 into two seats 51 and 52 in back-to-back relationship to one another. Accordingly, in some embodiments, seat 51 face the stern of the watercraft 2 and seat 52 faces to the bow of watercraft 2.

Figure 5B:
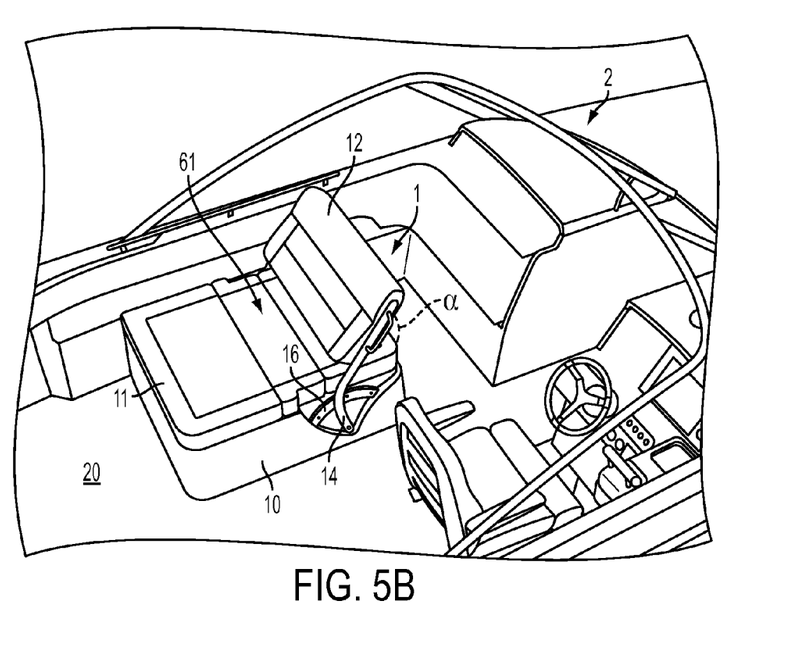
FIG. 5B is a perspective view of one embodiment of the seating system of the present invention configured as an aft-facing lounge seat.
Figure 5C:
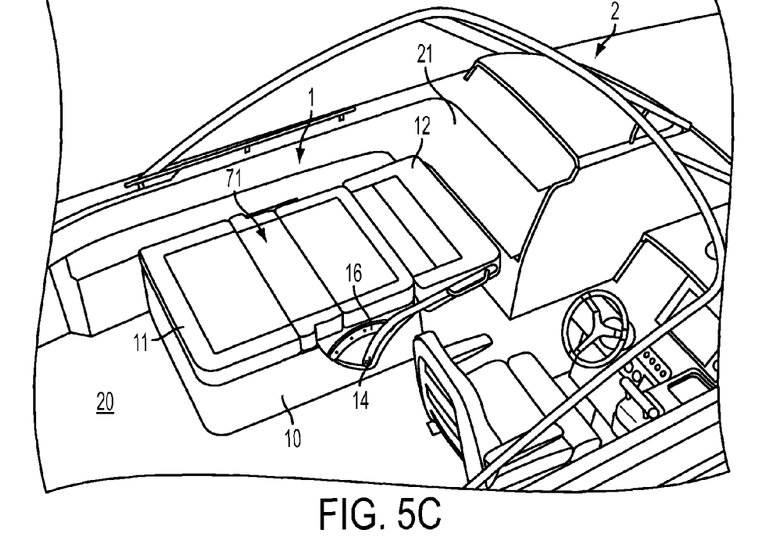
FIG. 5C is a perspective view of one embodiment of the seating system of the present invention configured as a sunpad.
Figure 5D:
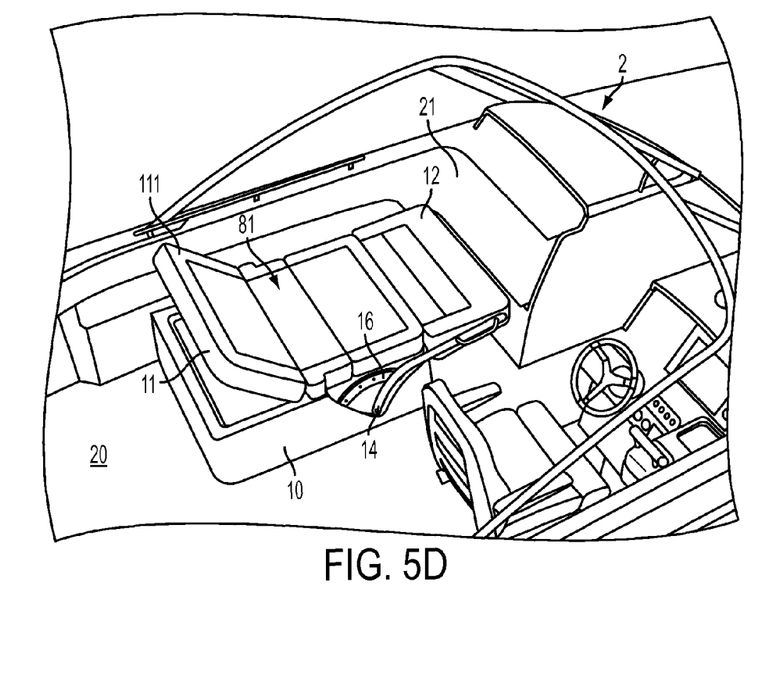
FIG. 5D is a perspective view of one embodiment of the seating system of the present invention configured as an aft-facing lounge seat.

FIG. 5B shows backrest 12 in a partially reclined position, positioned at an angle $\alpha$ with respect to the seating surface 11. In some embodiments, this angle $\alpha$ can vary between ninety (90) and zero (0) degrees however it is shown at approximately thirty (30) degrees in order to provide a boater with a comfortable aft-facing lounge seat 61. It is appreciated that when the angle $\alpha$ is ninety (90) degrees, the configuration shown in FIG. 5A is provided; when the angle $\alpha$ is zero (0) degrees, the configuration shown in FIGS. 5C and 5D is provided. It is appreciated that the angle $\alpha$ can vary as desired, depending on the design of the guide member 16 and more specifically the number and location of slots 17 in the guide member. Accordingly, the present invention contemplates numerous and varying potential orientations of backrest 21. It is appreciated that FIG. 5B is a representation of one potential position defining a comfortable aft-facing lounge seat 61. In addition to the aft-facing lounge seat 61, a user can stand on the other side of the system 1 and utilize backrest 12 as leaning post (where 1 points). This leaning post position can be accomplished by standing in the space forward of the base 10 and leaning against backrest 12 and the user can face any direction comfortably. Certainly the backrest 12 can function to allow simultaneous use as a leaning post and aft-facing lounge seat 61.

FIG. 5C shows backrest 12 in a fully reclined position such that the backrest 12 is substantially parallel to and aligned with the seating surface 11. Accordingly, the backrest 12 and the seating surface 11 align to form a sunpad 71. In some embodiments, the seating system 1 may be located adjacent to a bulkhead 21 on the watercraft 2. Thus, with backrest 12 in its fully reclined position, a boater can utilize the bulkhead 21 as a backrest or headrest and use the entire length of the sunpad 71 to stretch out his/her body. It is therefore appreciated that the sunpad 71 provides more usable lounging surface area as compared to the lounge seat 61 configuration shown in FIG. 5C.

FIG. 5D shows backrest 12 in a fully reclined position such as that shown in FIG. 5C. However, in this embodiment, the aft cushion 111 of the seating surface 11 is configured to pivot upward to an angled position. Here, a forward facing lounge seat 81 is created, wherein the aft cushion 111 serves as a supplemental backrest. In some embodiments, the bulkhead 21 can serve as a footrest. In this embodiment, the available lounging space may be larger than that of the aft-facing lounge seat 61 shown in FIG. 5B.

The seating system 1 of the present invention addresses the limitations in the prior art by providing the backrest 12 which pivots about a point on the lower base 10 so that it can create a variety of seating positions and seating configurations. In simpler configurations, the backrest 12 can be centered in an upright position providing useful forward and aft seating. Additionally, by placing the seating system 1 adjacent to a bulkhead 21, the seating system 1 can be converted into a large sunpad 71 that can also be used as an aft facing lounge when the bulkhead 21 is employed as a backrest. Further still, when the backrest 12 is articulated to a flat position with respect to the seating surface 11, the aft cushion 111 can also be rotated up to create a forward facing lounge seat 81. The intermediate stops in the backrest mechanism further allow the backrest 12 to be disposed at different angles with respect to the seating surface 11 providing substantial versatility. Finally, the backrest 12 can function as a leaning post of varying orientations.

It is appreciated that the present seating system 1 can comprise a variety of materials commonly used in construction of marine vessels and water craft including fiberglass, resins, plastics, vinyls, foams, and combinations thereof. Furthermore it is appreciated that the seating system 1 can be installed in any desired location on a marine vessel or watercraft including on the deck, in the cockpit, at the front of the vessel or elsewhere. In some embodiments, however, it is desirable to install the seating system 1 adjacent to a bulkhead in order to provide both forward and aft facing lounge seats and the sunpad functionality described here. To that end, the present invention can be installed in at any orientation or direction on a vessel and still provide enhanced functionality compared to seating systems available in the art. It is appreciated and understood, therefore, that the terms "aft" and "forward" are used as relative terms to describe the relative ends or opposing sides and/or directions of the system 1. Accordingly, such terms are not limiting as the orientation of the system 1 can vary with respect to a marine vessel to provide a plurality of possible orientations and seating positions. It is appreciated that the seating system of the present invention is not limited for use in connection with marine vessels and watercraft although the system is particularly well suited for such applications. Finally, it is understood that the size, shape and overall dimensions of the seating system 1 is not limited to those dimensions inferred from the drawings herein. The invention is designed to be scalable for a variety of applications without departing from the novel structure and function described herein.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A seating system, comprising:
   a base supporting a seating surface of one or more seat bottoms of a said seating system;
   a backrest pivotably attached to said base at a predetermined pivot point below the seating surface and offset from a laterally extending centerline of said base by one or more curved arms disposed at a respective side of said backrest;
   wherein said one or more curved arms in a curved portion of the curved arms releasably engages a curved guide member that is attached to said base, wherein the guide member is between the seating surface and the pivot point;
   wherein said backrest is configured to pivot about said pivot point and move along said curved guide member from a generally upright position toward a horizontal position to provide a plurality of selectable seating positions, wherein in the horizontal position, the backrest is generally coplanar with the seating surface; and
   wherein said guide member includes positional slots corresponding to said plurality of selectable seating positions.

2. The seating system of claim 1, wherein in one of said selectable seating positions said backrest is oriented substantially perpendicular to said seating surface such that said seating system provides an aft seat and a forward seat.

3. The seating system of claim 1, wherein in one of said selectable seating positions said backrest is oriented substantially parallel to said seating surface such that said seating system provides a sunpad.

4. The seating system of claim 1, wherein in one of said selectable seating positions said backrest is oriented at an angle between zero and ninety degrees with respect to said seating surface such that said seating system provides an aft-facing lounge seat.

5. The seating system of claim 1, wherein in one of said selectable seating positions said backrest is oriented at an angle between zero and ninety degrees with respect to said seating surface such that said seating system provides a forward-facing leaning post.

6. The seating system of claim 4, wherein said angle is between thirty and forty five degrees.

7. The seating system of claim 1, wherein said seating surface comprises one or more cushions hingeably attached to said base.

8. The seating system of claim 7, wherein said base comprises one or more storage compartments accessible by lifting said one or more cushions of said seating surface.

9. The seating system of claim 8, wherein said one or more cushions is capable of being hinged upward and locked in position to provide a supplemental backrest.

* * * * *